United States Patent
McLean

(10) Patent No.: US 9,882,518 B2
(45) Date of Patent: Jan. 30, 2018

(54) AUXILIARY WINDING FOR A GENERATOR

(71) Applicant: Generac Power Systems, Inc., Waukesha, WI (US)

(72) Inventor: Graham W. McLean, Lymm (GB)

(73) Assignee: Generac Power Systems, Inc., Waukesha, WI (US)

( * ) Notice: Subject to any disclaimer, the term of this patent is extended or adjusted under 35 U.S.C. 154(b) by 539 days.

(21) Appl. No.: 14/325,676

(22) Filed: Jul. 8, 2014

(65) Prior Publication Data

US 2016/0013744 A1    Jan. 14, 2016

(51) Int. Cl.
| | |
|---|---|
| *H02K 7/20* | (2006.01) |
| *H02P 9/04* | (2006.01) |
| *H02P 9/38* | (2006.01) |
| *H02K 3/12* | (2006.01) |
| *H02K 19/34* | (2006.01) |
| *H02K 19/36* | (2006.01) |
| *H02K 3/28* | (2006.01) |
| *H02K 7/18* | (2006.01) |

(52) U.S. Cl.
CPC ............. *H02P 9/38* (2013.01); *H02K 3/12* (2013.01); *H02K 19/34* (2013.01); *H02K 19/365* (2013.01); *H02K 3/28* (2013.01); *H02K 7/1815* (2013.01)

(58) Field of Classification Search
CPC . H02P 9/38; H02K 3/12; H02K 19/34; H02K 19/365
USPC .............................................................. 290/8
See application file for complete search history.

(56) References Cited

U.S. PATENT DOCUMENTS

| | | | |
|---|---|---|---|
| 3,132,296 A | 5/1964 | Nippes | |
| 3,479,543 A | 11/1969 | Drexler | |
| 3,702,964 A | 11/1972 | Kudlacik et al. | |
| 3,714,542 A | 1/1973 | Arutjunian et al. | |
| 3,768,002 A | 10/1973 | Drexler et al. | |
| 4,121,148 A | 10/1978 | Platzer | |
| 4,268,788 A | 5/1981 | Takeda et al. | |
| 4,352,051 A * | 9/1982 | Johnson | H02P 1/445 |
| | | | 310/198 |
| 4,477,767 A | 10/1984 | Cotzas | |
| 4,656,379 A | 4/1987 | McCarty | |
| 4,728,879 A | 3/1988 | Rounce | |
| 4,755,736 A | 7/1988 | Fluegel | |

(Continued)

FOREIGN PATENT DOCUMENTS

| | | |
|---|---|---|
| CN | 1619925 A | 5/2005 |
| CN | 102355107 A | 2/2012 |

(Continued)

OTHER PUBLICATIONS

PCT/US2013/039338 International Search Report and Written Opinion, dated Sep. 17, 2015. 12 pages.

*Primary Examiner* — Tulsidas C Patel
*Assistant Examiner* — Thomas Quigley
(74) *Attorney, Agent, or Firm* — Boyle Fredrickson, S.C.

(57) ABSTRACT

An auxiliary winding for use in an engine-driven generator system is disclosed. The auxiliary winding is separate from but resides with the main winding in the stator slots of an alternator in the generator system. The auxiliary winding is configured to utilize the fundamental component of the flux in the airgap of the alternator along with selected spatial harmonic components to provide power to an automatic voltage regulator during all operating conditions.

19 Claims, 5 Drawing Sheets

(56) References Cited

U.S. PATENT DOCUMENTS

| | | |
|---|---|---|
| 5,783,891 A | 7/1998 | Auinger et al. |
| 5,847,503 A * | 12/1998 | Roussel ............... H01J 29/762 |
| | | 313/426 |
| 6,025,700 A | 2/2000 | Czajkowski |
| 7,075,265 B2 | 7/2006 | Edelson |
| 7,301,311 B2 | 11/2007 | Xu et al. |
| 7,821,145 B2 | 10/2010 | Huang et al. |
| 7,990,115 B2 | 8/2011 | Anghel et al. |
| 8,013,578 B2 | 9/2011 | Czajkowski |
| 2003/0042742 A1 * | 3/2003 | Shimizu .................... H02P 9/04 |
| | | 290/41 |
| 2010/0148518 A1 | 6/2010 | Algrain |
| 2010/0295518 A1 | 11/2010 | Fuller et al. |

FOREIGN PATENT DOCUMENTS

| | | |
|---|---|---|
| CN | 202488313 | 10/2012 |
| EP | 233425 | 8/1987 |
| EP | 837555 | 4/1998 |
| GB | 2011186 | 7/1979 |
| GB | 2071430 | 9/1981 |
| JP | 09149613 | 6/1997 |
| JP | 2001028900 | 1/2001 |
| JP | 2007325385 | 12/2007 |
| KR | 10-2009-0034464 | 4/2009 |

\* cited by examiner

AUXILIARY WINDING FOR A GENERATOR

FIELD OF THE INVENTION

This invention relates generally to engine-driven, electrical generators, and in particular, to an auxiliary winding used to provide power to an adjustable voltage regulator (AVR) on a generator.

BACKGROUND AND SUMMARY OF THE INVENTION

Electrical generators are used in a wide variety of applications. Typically, an individual electrical generator operates in a stand-by mode wherein the electrical power provided by a utility is monitored such that if the commercial electrical power from the utility fails, the engine of the electrical generator is automatically started causing the alternator to generate electrical power. When the electrical output generated by the alternator reaches a predetermined voltage and frequency desired by the customer, a transfer switch transfers the load imposed by the customer from the commercial power lines to the electrical generator. As is known, most residential electric equipment in the United States is designed to be used in connection with an electrical supply having a fixed frequency, namely, sixty (60) hertz (Hz).

Typically, electrical generators utilize a single driving engine coupled to a generator or alternator through a common shaft. Upon actuation of the engine, the crankshaft rotates the common shaft so as to drive the alternator that, in turn, generates electrical power. The frequency of the output of most prior electrical generators depends on a fixed, operating speed of the engine. Typically, the predetermined operating speed of an engine for a two-pole, stand-by electrical generator is approximately 3600 revolutions per minute to produce the rated frequency for which the unit is designed.

It is desirable to maintain the predetermined operating speed of the engine and, therefore, maintain the rated frequency of the generator output. Changes in the magnitude of the load applied to the generator will cause fluctuations in the engine speed and resultant fluctuations in the output voltage and frequency. To minimize the fluctuations in the output voltage, a generator may utilize an automatic voltage regulator (AVR). The AVR receives a signal, or signals, from a sensor, or sensors, connected to the output of the generator which correspond to the current and/or voltage output from the generator. The AVR then regulates the current supplied to the rotor of the alternator to help maintain a constant output voltage at the load.

In order to provide the regulated current to the rotor, the AVR converts power received at an input to the regulated current. Historically, the AVR has been configured to receive power from one of three sources. According to a first option, the AVR may receive power from a battery. Alternatively, a permanent magnet (PM) alternator may be coupled to the rotor, and a stator winding from the PM alternator may provide power to the AVR. As still another option, generator systems utilize a pair of auxiliary windings, where both windings are used to supply power to the AVR.

Each of the afore-mentioned configurations to provide power to the AVR has certain disadvantages. Using a battery requires a system to keep the battery charged. Adding an additional PM alternator to the rotor requires a longer rotor shaft resulting in additional axial length of the alternator. Both the battery and PM alternator add significant cost to the generator system as well. When auxiliary windings are used, a pair of windings is typically used because the voltage induced in the first winding, coupled to the fundamental component of the voltage generated in the alternator, drops to near zero under certain fault conditions, such as a short circuit. In order for the AVR to continue operating under these fault conditions, a second auxiliary winding is provided that is coupled to another harmonic component of the voltage generated in the alternator. Because both the auxiliary windings are also wound on the stator, the size of the stator and the complexity of the windings are increased. Each auxiliary winding is also susceptible to coupling to undesirable harmonic components that may interfere with the AVR operation.

Therefore, it is a primary object and feature of the present invention to provide an improved method for providing power to an AVR of a generator.

It is another primary object and feature of the present invention to provide a single auxiliary winding on a stator that is coupled to desired harmonic components but rejects undesired harmonic components of the voltage generated by the stator.

In accordance with one embodiment of the present invention, an auxiliary winding for use in an alternator of a generator system is disclosed. The alternator includes a stator having multiple slots, a rotor having an excitation winding, and an airgap defined between the stator and the rotor. The auxiliary winding includes multiple turns of wire, where each turn is wound in a first direction in a first slot of the stator and in a second direction in a second slot of the stator. A distribution function defines a number of turns of wire that are present in each of the slots of the stator. The distribution function is defined to couple the auxiliary winding to a fundamental component and a desired spatial harmonic component, selected from multiple spatial harmonic components, of a magnetic flux generated in the airgap of the alternator, and the distribution function is defined to minimize coupling of the auxiliary winding to other spatial harmonic components of the magnetic flux other than the desired spatial harmonic component. The desired spatial harmonic component may be the third harmonic.

According to another aspect of the invention, the distribution function includes a first distribution component configured to couple the auxiliary winding to the fundamental harmonic component of the magnetic flux and a second distribution component configured to couple the auxiliary winding to the a desired spatial harmonic component of the magnetic flux. The first distribution component defines a magnitude corresponding to a portion of the turns of wire in each slot for coupling the auxiliary winding to the fundamental component of the magnetic flux and a sinusoidal function which corresponds to an angular position and a number of pole pairs present in the stator. The second distribution component defines a magnitude corresponding to a portion of the turns of wire in each slot for coupling the auxiliary winding to the desired spatial harmonic component of the magnetic flux and a sinusoidal function which corresponds to the angular position, the number of pole pairs present in the stator, and the desired spatial harmonic.

According to another embodiment of the invention, an alternator configured to be driven by an engine in an engine-driven generator system is disclosed. The alternator includes a stator, a rotor, and an AVR. The stator includes multiple slots, a main winding distributed in the plurality of slots, and an auxiliary winding also distributed in the plurality of slots. The auxiliary winding is distributed according to a distribution function which couples the auxiliary winding to a fundamental component and a desired spatial harmonic component of a magnetic flux generated in an airgap of the alternator. The distribution function also minimizes coupling of the auxiliary winding to other spatial harmonic components of the magnetic flux. The rotor is rotatably mounted within the stator and driven by the engine and includes an excitation winding configured to conduct a current which establishes the magnetic flux in the airgap. The AVR controls the current in the rotor as a function of at least one of a current and a voltage present on the main winding.

According to another embodiment of the invention, a method of providing power to an excitation winding on a rotor of an alternator in a generator system is disclosed. The generator system includes a single auxiliary winding and a main winding each wound on a stator of the alternator, and the stator is separated from the rotor by an airgap. The auxiliary winding receives power corresponding to a current conducted by the excitation winding and is wound on the stator to couple the auxiliary winding to a fundamental component and a desired spatial harmonic component of a magnetic flux generated in the airgap of the alternator and to minimize coupling of the auxiliary winding to other spatial harmonic components of the magnetic flux. Power is transmitted from the auxiliary winding to an automatic voltage regulator (AVR) and controlled by the AVR to supply the excitation winding as a function of the output voltage of the main winding.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

The various features and advantageous details of the subject matter disclosed herein are explained more fully with reference to the non-limiting embodiments described in detail in the following description.

Figure 1:
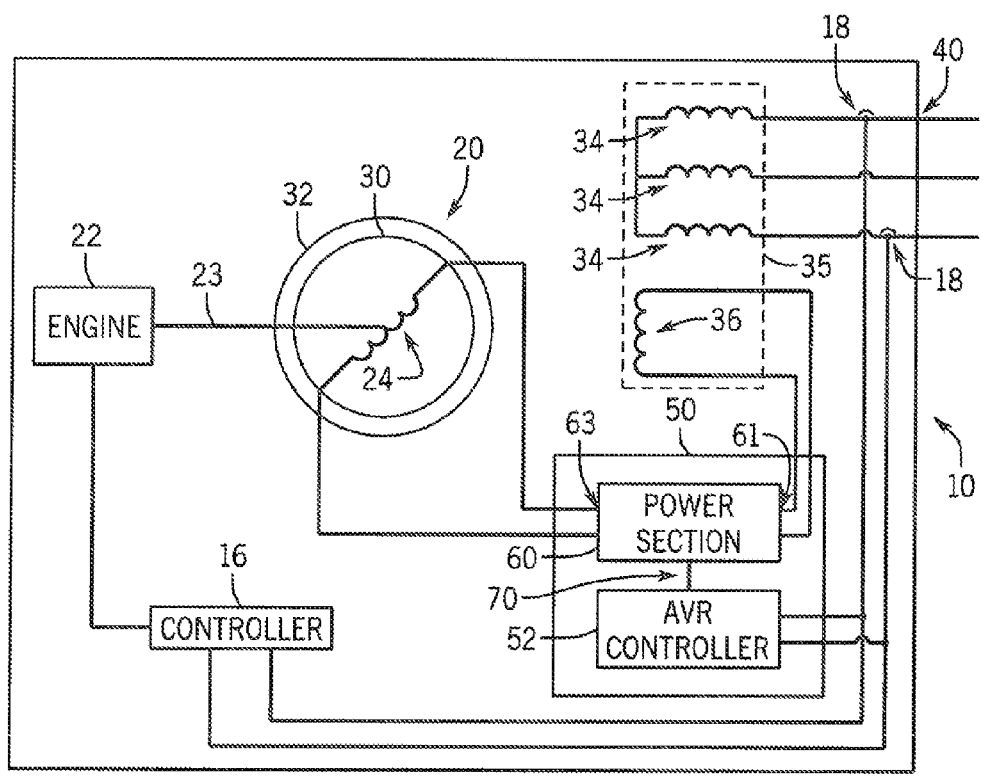
FIG. 1 is a block diagram representation of an exemplary generator system incorporating an auxiliary winding according to one embodiment of the invention.
Figure 5:
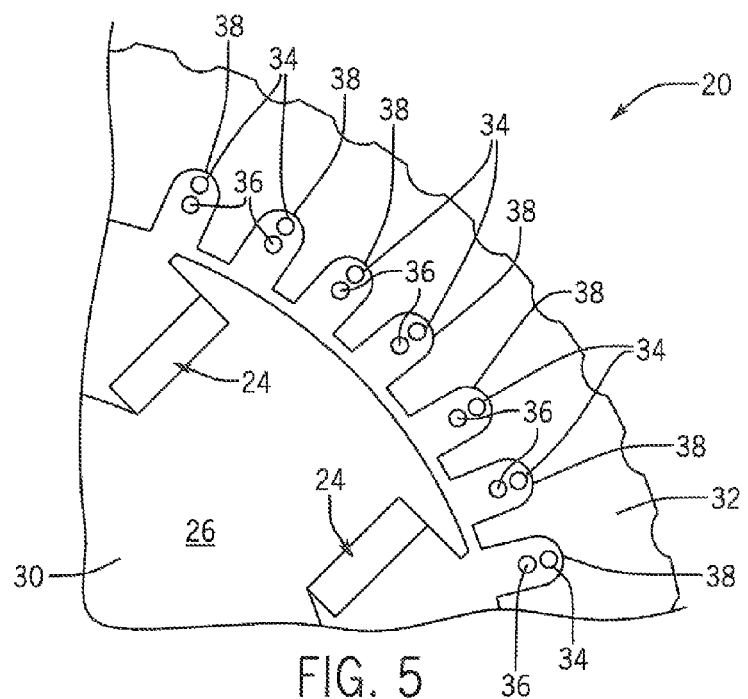
FIG. 5 is a partial cross-sectional view of one embodiment of an alternator from the generator system of FIG. 1.

Referring to FIGS. 1 and 5, an engine-driven, electrical generator system incorporating an auxiliary winding 36 according to one embodiment of the present invention is generally identified by the reference numeral 10. The generator system 10 includes an engine 22. As is conventional, the engine 22 receives fuel such as diesel, natural gas, or liquid propane vapor through an intake. The fuel provided to the engine 22 is compressed and ignited within each of the cylinders responsive to a firing signal so as to generate reciprocating motion of the pistons of the engine 22. The reciprocating motion of the pistons of the engine 22 is converted to rotary motion by a crankshaft. The crankshaft is operatively coupled to the rotor 30 of the alternator 20 through a shaft 23 such that as the crankshaft is rotated by operation of the engine 22, the shaft 23 drives the rotor 30 of the alternator 20. As is known, the frequency of the AC power at the output 40 of the generator system 10 is dependent upon the number of poles and the rotational speed of the rotor 30 which corresponds, in turn, to the speed of engine 22. The engine speed corresponding to a particular frequency of the AC power is called the synchronous speed (Ns) for that frequency. By way of example, the synchronous speed for a two pole rotor producing AC power at 60 hertz at the output 40 is 3600 revolutions per minute.

The generator system 10 includes a controller 16 operatively connected to one or more current transformers 18 and to the throttle actuator (not shown) of the engine 22. The current transformer 18 measures a magnitude of the load at the output 40 of the generator system 10 and supplies a signal corresponding to the same to the controller 16. The controller 16 provides a speed command to the engine to set the desired operating speed. In response to instructions received from the controller 16, the throttle actuator coupled to the engine 22 increases or decreases the speed of the engine 22. Optionally, one or more voltage sensors may be connected across the phases of the output 40 to generate a signal corresponding to the output voltage and to supply the signal to the controller 16. It is also contemplated for the controller 16 to receive various additional inputs indicative of the engine operating conditions (e.g., engine speed) and to provide additional control commands (e.g., an engine shutdown command in the event oil pressure is lost) to the engine 22.

The generator system 10 further includes an alternator 20 defined by a rotor 30 rotatably received within a stator 32. The rotor 30 includes an excitation winding 24 wound around one or more pole pairs 26. The stator 32 includes stator windings 35 wound within slots 38 of the stator 32. According to the illustrated embodiment, the stator 32 includes a three-phase main winding 34 and a single-phase auxiliary winding 36 each distributed within the slots 38 of the stator 32. For ease of illustration, the three-phase main winding 34 and the single-phase auxiliary winding 36 are each shown with a single turn in each slot 38 of the stator. In practice, each winding may have no turns or multiple turns in a slot 38 and may be distributed in varying numbers of turns across different slots 38. The distribution of turns for the auxiliary winding 36 will be discussed in more detail below. Each of the main winding 34 and the auxiliary winding 36 are separate windings each wound within the slots 38 of the stator 32. When a current is present in the excitation winding 24, rotation of the rotor 30 generates a moving magnetic field around the stator 32 which, in turn, induces a voltage in the stator windings 35. As a result, alternating current (AC) power is provided across the stator windings 35. The main winding 34 is connected to the output 40 of the generator system 10 to supply AC power to one or more loads.

Figure 3:
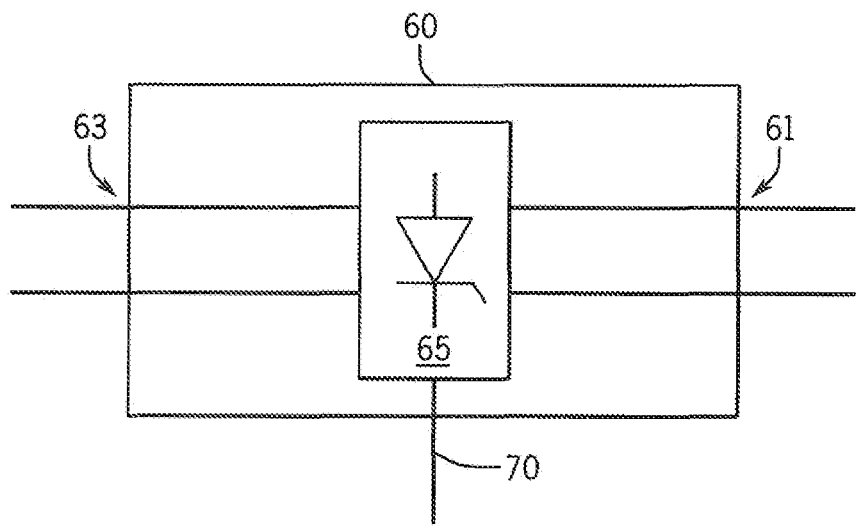
FIG. 3 is a block diagram representation of one embodiment of a power section from the generator system of FIGS. 1 and 2.

The current in the excitation winding 24 is controlled by the AVR 50 to achieve a desired voltage at the output 40 of the generator system 10. Signals corresponding to the current and/or voltage at the output 40 of the generator system 10 are provided to an AVR controller 52. According to one embodiment of the invention, the AVR 50 includes the AVR controller 52 separate from the controller 16 of the generator system 10. According to another embodiment of the invention, the controller 16 of the generator system 10 also controls the AVR 50. The AVR 50 includes a power section 60 which receives an alternating current (AC) voltage from the auxiliary winding 36 at an input 61 and supplies a rectified voltage at an output 63. Referring also to FIG. 3, in one embodiment of the invention, the power section includes a phase-controlled rectifier 65. The phase-controlled rectifier 65 includes switching devices such as thyristors, silicon-controller rectifiers (SCRs), insulated gate bipolar transistors (IGBTs), or metal-oxide semiconductor field-effect transistors (MOSFETs) that are enabled by a control signal 70 from the AVR controller 52. The control signal 70, or an additional control signal 70, may be utilized to disable the switching device or, optionally, the switching device may become disabled when the voltage across the device, such as a thyristor, drops below a threshold level. Any suitable technique of generating the control signals 70 as is understood in the art may be utilized to convert the AC voltage at the input 61 to a rectified voltage having a variable amplitude at the output 63. The AVR controller 52 generates the control signals 70 to vary the amplitude of the rectified voltage as a function of the current and/or voltage at the output 40 of the generator system 10. Signals 70, including, but not limited to, feedback and/or control signals, may be communicated between the power section 60 and the AVR controller 52. The signals 70 may include voltage and/or current feedback signals at various locations in the power section 60 or gating signals to control switching devices.

Figure 4:
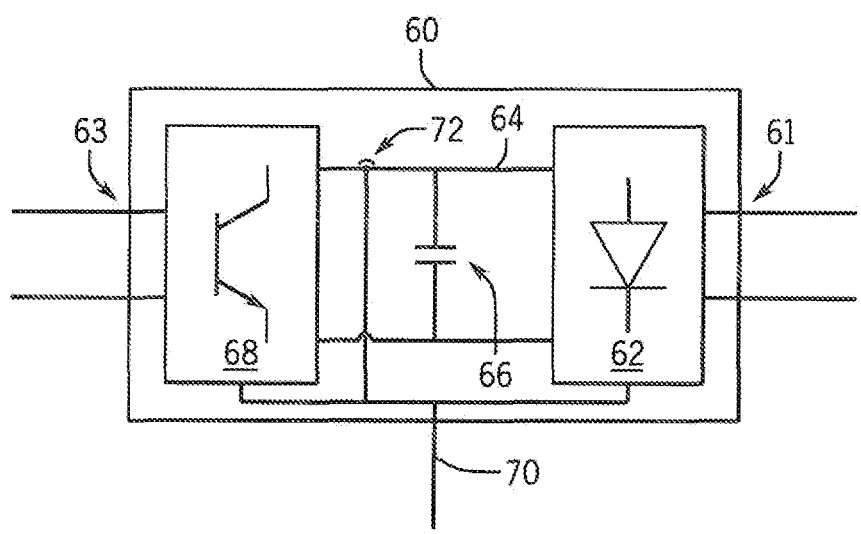
FIG. 4 is a block diagram representation of another embodiment of a power section from the generator system of FIGS. 1 and 2.

According to another embodiment of the invention, illustrated in FIG. 4, the power section 60 includes a rectifier section 62 which converts an AC input voltage to a DC voltage on a DC bus 64. The rectifier section 62 may be a passive rectifier, including, for example, diodes, or an active rectifier, including switching devices, such as thyristors, SCRs, IGBTs, or MOSFETs. Signals 70, including, but not limited to, feedback and/or control signals, may be communicated between the rectifier section 62 and the AVR controller 60. The signals 70 may include voltage and/or current feedback signals at various locations in the rectifier section 62 or gating signals to control the switching devices. The DC bus 64 may include a capacitive element 66 to reduce the voltage ripple present on the DC bus 64. The capacitive element 66 may include a single capacitor or multiple capacitors connected in series, in parallel, or a combination thereof according to the application requirements. One or more sensors 72 may be connected to the DC bus 64 to provide a signal 70 corresponding to the voltage and/or current present on the DC bus to the AVR controller 52. A converter section 68 converts the DC voltage on the DC bus 64 from one voltage potential to a second voltage potential on the output 63 of the AVR 50. Optionally, the converter section 68 may convert the DC voltage on the DC bus 64 from a DC voltage to an AC voltage having a variable voltage and a variable frequency. The output 63 of the AVR 50 is provided to the excitation winding 24 to achieve a desired voltage at the output 40 of the generator system 10 when the engine 22 is running. Signals 70, including, but not limited to, feedback and/or control signals, may be communicated between the converter section 68 and the AVR controller 52. The signals 70 may include voltage and/or current feedback signals at various locations in the converter section 68 or gating signals to control switching devices.

According to one embodiment of the invention, the excitation winding 24 may be connected to the output 63 of the AVR 50 via slip rings. With reference again to FIG. 1, this is illustrated by a direct electrical connection between the output 63 of the AVR and the excitation winding 24. The current carried in the excitation winding 24 establishes a magnetic field in the airgap of the alternator 20. When the engine drives rotation of the rotor 30, the magnetic field becomes a rotating magnetic field suitable for inducing voltages in the stator windings 35.

Figure 2:
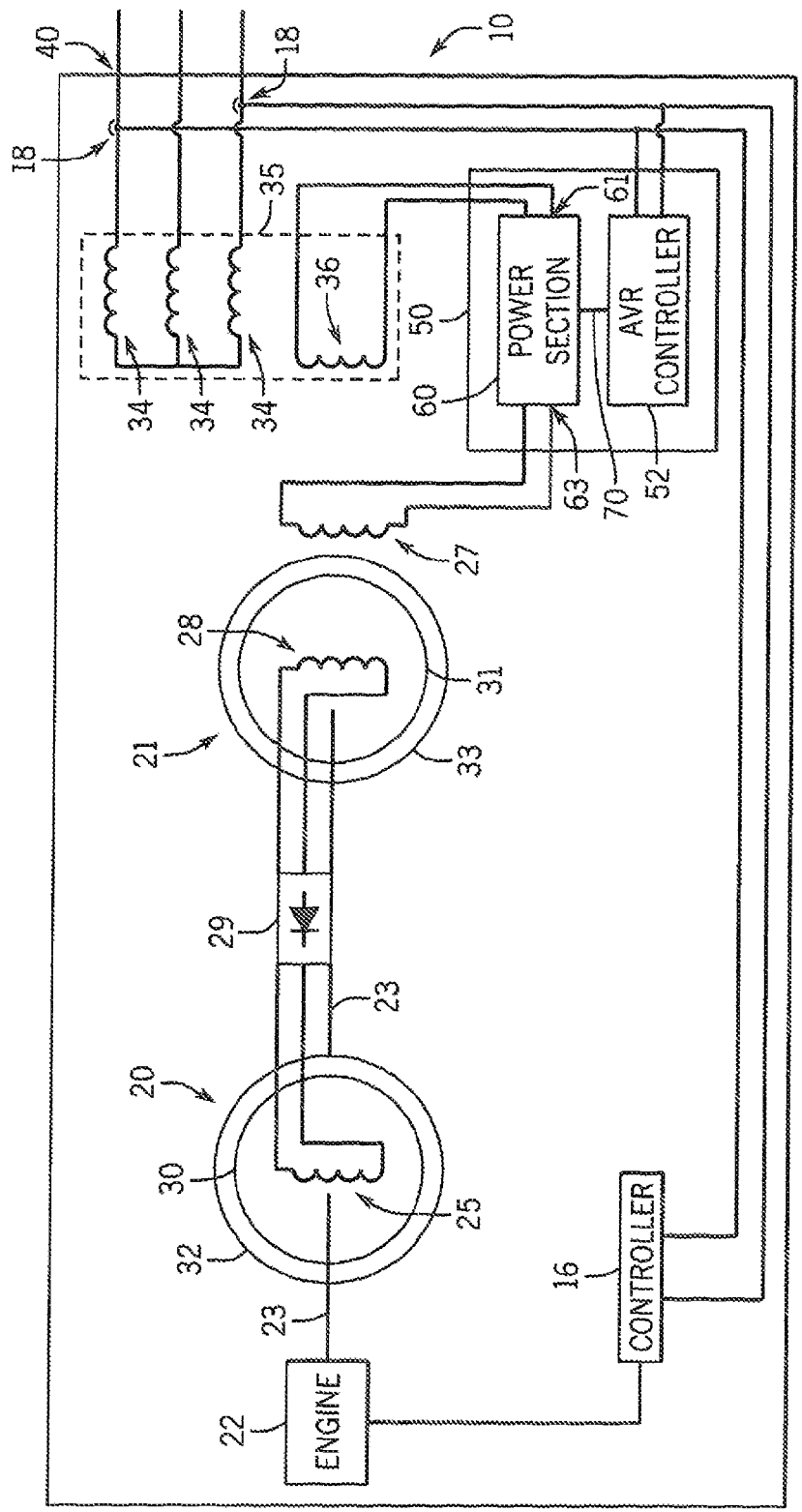
FIG. 2 is a block diagram representation of another exemplary generator system incorporating an auxiliary winding according to one embodiment of the invention.

According to another embodiment of the invention, the excitation winding 24 may be split into a main field winding 24 and an exciter 21. With reference to FIG. 2, the exciter 21 includes a stator 33 and a rotor 31. The shaft 23 from the engine 22 may extend through the rotor 30 of the alternator 20 or, optionally, the shaft 23 from the engine 22 may be coupled to one end of the rotor 30 and a second shaft 23 extend from the other end of the rotor 30 such that the rotor 30 of the alternator 20 and the rotor of the exciter 21 are both driven by the engine 22. The exciter field may include a pair of windings, one stationary 27 and one rotational 28, inductively coupled to each other. The stationary winding 27 is wound on the stator 33 of the exciter 21 and connected to the output 63 of the AVR 50. The rotational winding 28 is located on the rotor 31 of the exciter 21 and receives a voltage, inductively coupled from the stationary winding 27 as a function of the rotational speed of the rotor 31 and the magnitude of the voltage in the stationary winding 27. In addition, a diode bridge 29 may be mounted to the shaft 23 to convert the AC voltage from the rotational winding 29 to a DC voltage for the main field winding 25. Optionally, the diode bridge 29 may be mounted to the rotor 31 of the exciter 21 or to the rotor 30 of the alternator 20. The current carried in the main field winding 25 establishes a magnetic field in the airgap of the alternator 20. When the engine drives rotation of the rotor 30, the magnetic field becomes a rotating magnetic field suitable for inducing voltages in the stator windings 35. The auxiliary winding 36 is configured to provide power to the AVR 50 from the magnetic flux generated in the airgap of the alternator 20 by coupling with the fundamental component of the magnetic flux as well as selected harmonic components while minimizing coupling with other selected harmonic components. According to one embodiment of the invention, the auxiliary winding 36 is configured to couple with the fundamental component and with a desired spatial harmonic component, such as the third harmonic component, of the magnetic flux while minimizing coupling with other harmonic components of the magnetic flux.

Figure 6:
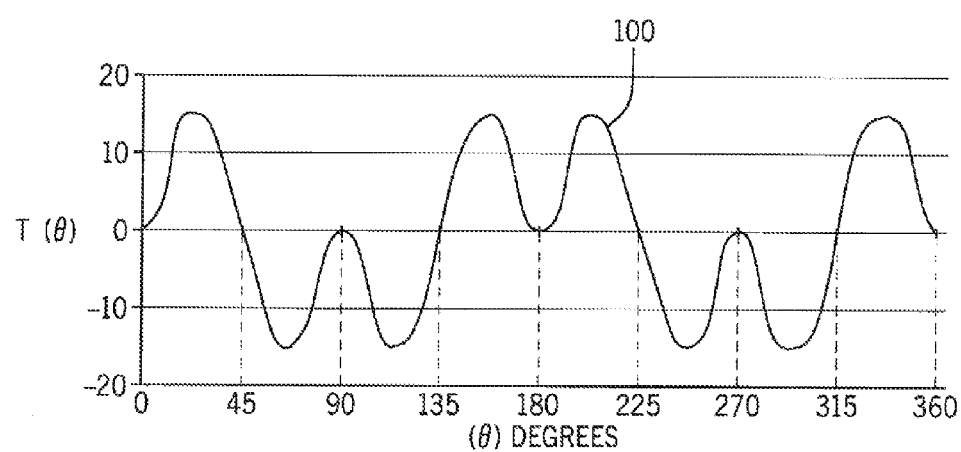
FIG. 6 is a graphical representation of an idealized continuous winding distribution for an auxiliary winding according to one embodiment of the invention.

With reference to FIG. 6, an idealized winding distribution 100 which causes the auxiliary winding 36 to couple with the fundamental component and with the third harmonic component of the magnetic flux while minimizing coupling with other harmonic components of the magnetic flux is illustrated. The idealized winding distribution 100 illustrates the number of turns, T, that would be present at any given angle, θ, to produce the desired coupling by the auxiliary winding 36 with the magnetic flux in the airgap in the alternator 20. The idealized winding distribution 100 is generated according to a distribution function having a first distribution component, configured to couple the auxiliary winding 36 to the fundamental component of the magnetic flux, and a second distribution component, configured to couple the auxiliary winding 36 to the third harmonic component of the magnetic flux. It is contemplated that the distribution function may include still other components configured to couple to other harmonic content without deviating from the scope of the invention. The first distribution component defines a magnitude corresponding to a portion of the turns of wire in any one of the slots 38 of the stator 32 and also includes a sinusoidal function, such as a sine or a cosine function. The angle of the sinusoidal function for the first distribution component is defined as a function of the angular position on the stator 32 and of the number of pole pairs present in the stator 32. The angular position may be defined by selecting one point on the stator 32 as a starting point, or zero degrees, and the angular position increases from zero degrees to three hundred sixty degrees in one rotation around the stator 32. The second distribution component also defines a magnitude corresponding to a portion of the turns of wire in any one of the slots 38 of the stator 32 and includes a sinusoidal function, such as a sine or cosine function. The angle of the sinusoidal function for the second distribution component is defined as a function of the angular position, the number of pole pairs present in the stator, and the harmonic number from the magnetic flux to which the auxiliary winding is to be coupled. In addition, either the first or the second distribution component may include an angle offset component which shifts the distribution of the winding component around the stator 32. The first and second distribution components are added together to define the idealized distribution of windings in each slot 38 of the stator 32 as a function of the angular position of each slot 38 around the stator 32. According to one embodiment of the invention, the idealized winding distribution 100 may be represented by Eq. 1, given below. In Eq. 1, the first distribution component is defined by $T_1 \cos(n\theta+\varphi_1)$ and the second distribution component is defined by $T_h \cos(n \cdot h \cdot \theta+\varphi_h)$. According to the illustrated embodiment in FIG. 6, the alternator 20 includes two pole pairs, the first sinusoidal component has no angle offset, and the second sinusoidal component couples to the third harmonic component of the magnet flux and has one hundred eighty degrees of angle offset.

$$T(\theta)=T_1 \cos(n\theta+\varphi_1)+T_h \cos(n \cdot h \cdot \theta+\varphi_h) \quad (1)$$

where:
θ: angular position within the alternator,
n: number of pole pairs in the alternator,
h: number of the harmonic component,
T(θ): number of turns as a function of the angular position,
$T_1$: magnitude of the first distribution component for coupling to the fundamental component of the magnetic flux,
$T_h$: magnitude of the second distribution component for coupling to each harmonic component of the magnetic flux,
$\varphi_1$: angle offset for the fundamental component, and
$\varphi_h$: angle offset for the harmonic component.

Figure 7:
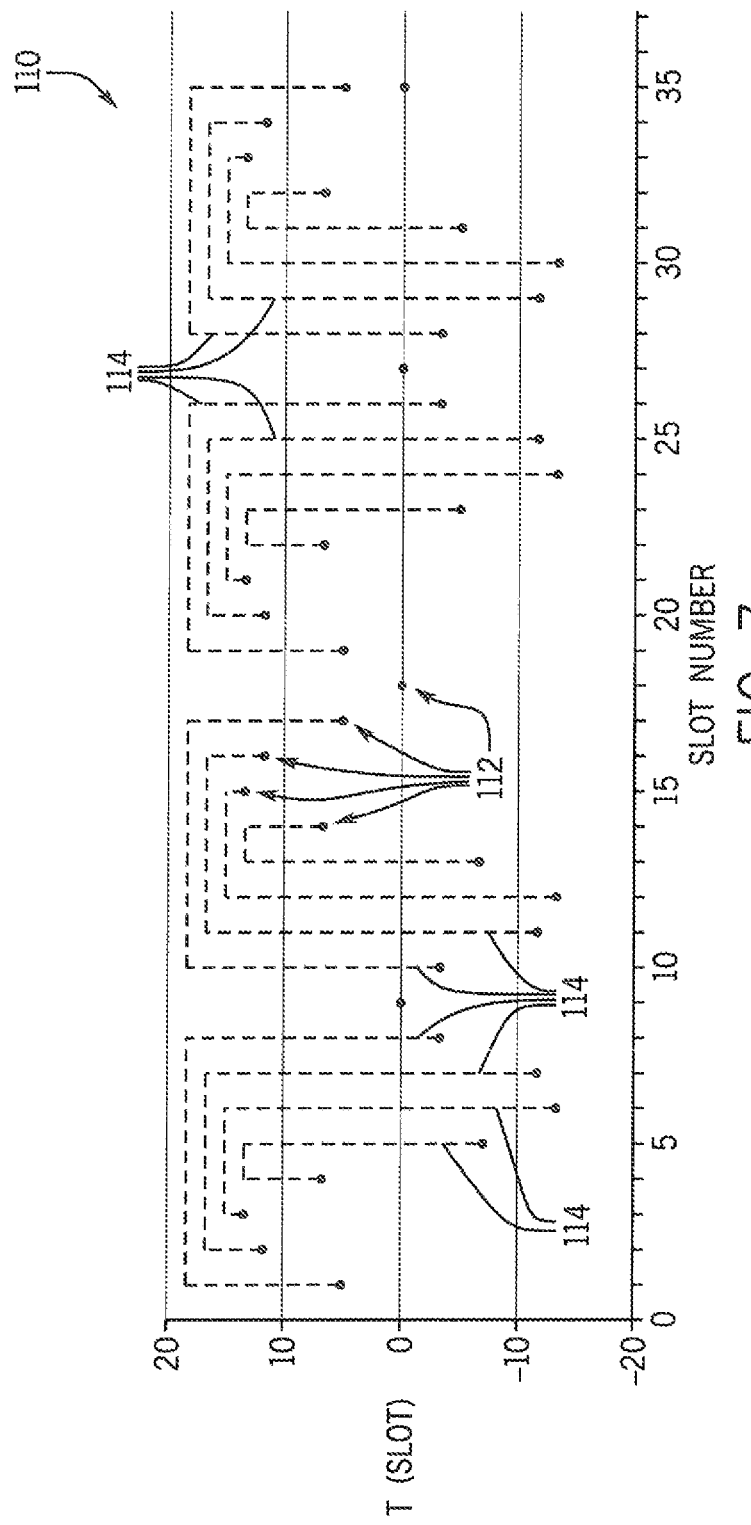
FIG. 7 is a graphical representation of a practical winding distribution based on the idealized distribution of FIG. 6.

With reference next to FIG. 7, a practical distribution winding 110 based on the idealized winding distribution 100 from FIG. 6 is illustrated. The auxiliary winding 36 requires integer values 112 of turns to be located in each slot 38 of the stator 32 where the slots are distributed at incremental angular positions, θ, around the stator 32. The integer values 112 of turns are chosen by selecting an integer value corresponding to the value of the idealized winding distribution 100 at each angular position of the corresponding slot 38. According to one embodiment, the closest integer value corresponding to the value of the idealized winding distribution 100 is selected. For example, if the idealized winding distribution 100 at ten degrees is four and two-tenths, the practical distribution winding 110 will include four turns in the slot 38 positioned at ten degrees. Optionally, another integer value, near the value of the idealized winding distribution 100 is selected. For example, the other integer value may provide better attenuation of an undesired harmonic component than the closest integer value. According to the illustrated embodiment, end turns 114 are also shown as a convenient method of connecting the turns in each slot 38 to form a concentric winding.

In operation, the generator system 10 receives a command to begin operation. The command may be generated internally or externally, for example, upon detection of a failure in the utility grid or for a scheduled operation. The engine 22 is started such that the alternator 20 generates electrical power at the output 40 of the generator system 10, as heretofore described. The controller 16 may initially accelerate the engine 22 up to a maximum operating speed and achieve a stable output power. One or more electrical loads are then connected to the output 40 to receive power from the generator system 10. The controller 16 monitors the output 40 of the generator system 10 and may provide instructions to the throttle actuator coupled to the engine 22 to increase or decrease the engine speed.

Once the engine 22 is up to speed, the power section 60 of the AVR 50 begins providing current to the excitation winding 24. Initially, the AVR 50 requires a battery or other energy source connected to the power section 60 in order to supply power to the excitation winding 24. Once the initial current is supplied to the excitation winding 24, the auxiliary winding 36 begins receiving power from the magnetic flux in the airgap of the alternator 20. The AVR 50 then begins receiving power at the input 61 of the power section 60 from the auxiliary winding 36. The main winding 34 also begins receiving power from the magnetic flux in the airgap of the alternator 20, and the AVR controller 52 monitors the output 40 of the generator system 10. The AVR controller 52 controls operation of the power section 60 to regulate the current at the output 63 of the power section 60 at a desired magnitude and/or frequency as a function of the voltage at the output 40 of the generator system 10. According to one embodiment of the invention, the AVR controller 52 and the controller 16 of the generator system 10 may be the same controller.

The auxiliary winding 36 is configured to provide power to the power section 60 of the AVR 50 under varying operating conditions of the generator system 10. The first distribution component of the distribution function links the auxiliary winding 36 to the fundamental component of the magnetic flux. Under most operating conditions of the generator system 10, including, but not limited to, varying percentages of loading and at various power factors of the generator system 10, the fundamental component has a sufficient magnitude to provide the power required to the AVR 50 such that the AVR 50 can, in turn, power the excitation winding 24. Under a short circuit condition, the voltage across the output 40 drops significantly and the fundamental component of the magnetic flux similarly drops. The magnitude of the third harmonic component of the magnetic flux, however, increases, significantly under the short circuit condition. The second distribution component of the distribution function, therefore, is configured to link the auxiliary winding 36 to the third harmonic component of the magnetic flux and to provide power to the AVR 50 during a short circuit condition.

The auxiliary winding 36 is further configured to minimize coupling with other harmonic components of the magnetic flux in the airgap. While the first and second distribution components of the distribution function are configured to couple to the fundamental component and a selected harmonic component of the magnetic flux, respectively, each of the first and second distribution components are further configured to remain uncoupled to other harmonic components of the magnetic flux. Thus, an auxiliary winding 36 configured according to the idealized winding distribution 100 would have only the desired harmonic components present at the input to the power section 60 of the AVR 50. However, as illustrated in FIG. 7, a practical distribution winding 110 requires discrete numbers of turns positioned within slots 38 in the stator 32 located at fixed angular intervals. Therefore, some coupling between the auxiliary winding 36 and the other harmonic components results. However, the magnitude of the voltages of the other harmonic components remains small enough to not impact the switching of components in the power section 60. If a further reduction in the impact of the coupling with undesired harmonic components is desired, the power section 60 may include the rectifier section 62 to first convert the voltage at the input 61 to a DC voltage. The capacitive element 66 may further reduce ripple still present in the DC voltage after rectification, and the converter section 68 is controlled to provide the desired current and/or voltage at the output 63 of the power section 60.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

I claim:

1. An alternator for a generator system, comprising:
   a rotor having an excitation winding;
   a stator having a plurality of slots, wherein a three-phase main winding and a single-phase auxiliary winding are each wound in the plurality of slots; and
   an airgap defined between the stator and the rotor, wherein the auxiliary winding includes a plurality of turns of wire, each turn wound in a first direction in a first slot selected from the plurality of slots of the stator and in a second direction in a second slot selected from the plurality of slots of the stator and wherein:
   each of the plurality of turns of wire are wound in the plurality of slots according to a distribution function;
   the distribution function is defined to couple the auxiliary winding to a fundamental component and a desired spatial harmonic component selected from a plurality of spatial harmonic components of a magnetic flux generated in the airgap, the desired special harmonic component having a magnitude greater than magnitudes of the plurality of spatial harmonic components under a short circuit condition; and
   the distribution function is configured to link the auxiliary winding to the desired spatial harmonic component during the short circuit condition.

2. The alternator of claim 1 wherein the desired spatial harmonic component is the third harmonic.

3. The alternator of claim 1 wherein the distribution function includes a first distribution component configured to couple the auxiliary winding to the fundamental harmonic component of the magnetic flux and a second distribution component configured to couple the auxiliary winding to the desired spatial harmonic component of the magnetic flux.

4. The alternator of claim 3 wherein the first distribution component of the distribution function defines a magnitude corresponding to a portion of the turns of wire in each of the plurality of slots for coupling the auxiliary winding to the fundamental component of the magnetic flux and a sinusoidal function corresponding to an angular position and a number of pole pairs present in the stator.

5. The alternator of claim 4 wherein the second distribution component of the distribution function defines a magnitude corresponding to a portion of the turns of wire in each of the plurality of slots for coupling the auxiliary winding to the desired spatial harmonic component of the magnetic flux and a sinusoidal function corresponding to the angular position, the number of pole pairs present in the stator, and the desired spatial harmonic.

6. The alternator of claim 5 wherein the distribution function is defined by $T(\theta)=T_1 \cos(n\theta+\varphi_1)+T_h \cos(n \cdot h \cdot \theta+\varphi_h)$, where:
   $\theta$ is the angular position,
   n is the number of pole pairs,
   h is the desired spatial harmonic component,
   $T(\theta)$ is a number of turns as a function of the angular position,
   $T_1$ is the magnitude of the first distribution component for coupling to the fundamental component,
   $T_h$ is the magnitude of the second distribution component for coupling to the desired spatial harmonic component,
   $\varphi_1$ is an angle offset for the fundamental component, and
   $\varphi_h$ is an angle offset for the desired spatial harmonic component.

7. A method of providing power to an excitation winding on a rotor of an alternator in a generator system, the method comprising the steps of:
   winding each of a three-phase main winding and a single-phase auxiliary winding on a stator of the alternator, the stator being separated from the rotor by an airgap;
   receiving power on the auxiliary winding corresponding to a current conducted by the excitation winding, wherein the auxiliary winding is wound on the stator to couple the auxiliary winding to a fundamental component and a desired spatial harmonic component selected from a plurality of spatial harmonic components of a magnetic flux generated in the airgap of the alternator;
   transmitting the power from the auxiliary winding to an automatic voltage regulator (AVR);
   controlling power from the AVR to the excitation winding as a function of the output voltage of the main winding; and
   linking the auxiliary winding to the desired spatial harmonic component during a short circuit condition;
   wherein:
   the desired special harmonic component has a magnitude greater than magnitudes of the plurality of spatial harmonic components under the short circuit condition.

8. The method of claim 7 wherein the desired spatial harmonic component is the third harmonic.

9. The method of claim 7 wherein the auxiliary winding is wound according to a distribution function having a first distribution component configured to couple the auxiliary winding to the fundamental harmonic component of the magnetic flux and a second distribution component configured to couple the auxiliary winding to the desired spatial harmonic component of the magnetic flux.

10. The method of claim 9 wherein the first distribution component of the distribution function defines a magnitude corresponding to a portion of the turns of wire in each of a plurality of slots in the stator for coupling the auxiliary winding to the fundamental component of the magnetic flux and a sinusoidal function corresponding to an angular position and a number of pole pairs present in the stator.

11. The method of claim 10 wherein the second distribution component of the distribution function defines a magnitude corresponding to a portion of the turns of wire in each of the plurality of slots for coupling the auxiliary winding to the desired spatial harmonic component of the magnetic flux and a sinusoidal function corresponding to the angular position, the number of pole pairs present in the stator, and the desired spatial harmonic.

12. An alternator configured to be driven by an engine in an engine-driven generator system, the alternator comprising:
  a stator, including:
    a plurality of slots,
    a three-phase main winding distributed in the plurality of slots, and
    a single-phase auxiliary winding distributed in the plurality of s according to a distribution function, wherein the distribution function defines a distribution of the auxiliary winding in the slots of the stator in order to couple the auxiliary winding to a fundamental component and a desired spatial harmonic component of a magnetic flux generated in an airgap of the alternator;
  a rotor, rotatably mounted within the stator and driven by the engine, the rotor including an excitation winding configured to conduct a current which establishes the magnetic flux in the airgap; and
  an automatic voltage regulator (AVR) controlling the current in the rotor as a function of at least one of a current and a voltage present on the main winding;
wherein:
  the auxiliary winding is linked to the desired spatial harmonic component during a short circuit condition; and
  the desired special harmonic component has a magnitude greater than magnitudes of the plurality of spatial harmonic components under a short circuit condition.

13. The alternator of claim 12 wherein the desired spatial harmonic component is the third harmonic.

14. The alternator of claim 12 wherein the AVR includes a power section including:
  an input electrically connected to the auxiliary winding,
  an output electrically connected to the excitation winding, and
  a plurality of switches selectively connecting the input to the output.

15. The alternator of claim 12 wherein the AVR includes a power section including:
  an input electrically connected to the auxiliary winding,
  an output electrically connected to the excitation winding,
  a rectifier section electrically connected to the input and configured to convert an alternating current (AC) voltage at the input to a direct current (DC) voltage at a first DC voltage potential, and
  a converter section electrically connected between the rectifier section and the output and configured to convert the DC voltage at the first DC voltage potential to one of a DC voltage at a second voltage potential and an AC voltage at the output.

16. The alternator of claim 12 wherein the distribution function includes a first distribution component configured to couple the auxiliary winding to the fundamental harmonic component of the magnetic flux and a second distribution component configured to couple the auxiliary winding to the desired spatial harmonic component of the magnetic flux.

17. The alternator of claim 16 wherein the first distribution component of the distribution function defines a magnitude corresponding to a portion of the turns of wire in each of the plurality of slots for coupling the auxiliary winding to the fundamental component of the magnetic flux and a sinusoidal function corresponding to an angular position and a number of pole pairs present in the stator.

18. The alternator of claim 17 wherein the second distribution component of the distribution function defines a magnitude corresponding to a portion of the turns of wire in each of the plurality of slots for coupling the auxiliary winding to the desired spatial harmonic component of the magnetic flux and a sinusoidal function corresponding to the angular position, the number of pole pairs present in the stator, and the desired spatial harmonic.

19. The alternator of claim 18 wherein the distribution function is defined by $T(\theta)=T_1 \cos(n\theta+\varphi_1)+T_h \cos(n \cdot h \cdot \theta+\varphi_h)$, where:
  $\theta$ is the angular position,
  n is the number of pole pairs,
  h is the desired spatial harmonic component,
  $T(\theta)$ is a number of turns as a function of the angular position,
  $T_1$ is the magnitude of the first distribution component for coupling to the fundamental component,
  $T_h$ is the magnitude of the first distribution component for coupling to the desired spatial harmonic component,
  $\varphi_1$ is an angle offset for the fundamental component, and
  $\varphi_h$ is an angle offset for the desired spatial harmonic component.

* * * * *